(12) United States Patent
Tandjeu-Tchuissi et al.

(10) Patent No.: US 11,193,793 B2
(45) Date of Patent: Dec. 7, 2021

(54) SENSOR SYSTEM FOR DETERMINING AN ABSOLUTE ROTATIONAL ANGLE OF A SHAFT, METHOD FOR DETERMINING AN ABSOLUTE ROTATIONAL ANGLE OF A SHAFT, AND VEHICLE HAVING A SENSOR SYSTEM

(71) Applicant: VALEO Schalter und Sensoren GmbH, Bietigheim-Bissingen (DE)

(72) Inventors: Landry Tandjeu-Tchuissi, Bietigheim-Bissingen (DE); Onofrio Intini, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 16/325,977

(22) PCT Filed: Aug. 3, 2017

(86) PCT No.: PCT/EP2017/069691
§ 371 (c)(1),
(2) Date: Feb. 15, 2019

(87) PCT Pub. No.: WO2018/033403
PCT Pub. Date: Feb. 22, 2018

(65) Prior Publication Data
US 2019/0178681 A1    Jun. 13, 2019

(30) Foreign Application Priority Data
Aug. 18, 2016 (DE) .................. 10 2016 115 310.9

(51) Int. Cl.
*G01D 5/14* (2006.01)
*B62D 15/02* (2006.01)

(52) U.S. Cl.
CPC ........... *G01D 5/14* (2013.01); *B62D 15/0215* (2013.01); *B62D 15/0245* (2013.01); *G01D 5/145* (2013.01)

(58) Field of Classification Search
CPC ...... G01D 5/145; G01D 5/14; B62D 15/0215; B62D 15/0245
See application file for complete search history.

(56) References Cited

U.S. PATENT DOCUMENTS 8,000,860 B2 * 8/2011 Wu .................... B62D 15/0215
180/443
9,322,635 B2 * 4/2016 Blume, Jr. ............... G01B 7/30
(Continued)

FOREIGN PATENT DOCUMENTS

DE    19506938 A1    8/1996
DE    19757116 A1    6/1999
(Continued)

OTHER PUBLICATIONS

International Search Report and Written Opinion issued in corresponding Internation Application No. PCT/EP2017/069691, dated Oct. 25, 2017 (9 pages).
(Continued)

*Primary Examiner* — Jay Patidar
(74) *Attorney, Agent, or Firm* — Osha Bergman Watanabe & Burton LLP (57) ABSTRACT

The invention relates to a sensor system (1), and a method for determining an absolute rotation angle (δ) of a shaft (10) with a rotation angle range of more than one revolution and to a vehicle fitted with a sensor system (1), wherein the sensor system (1) has a main rotor (2) that can be connected rotationally synchronously to the shaft (10), a first auxiliary rotor (3) which is mechanically coupled to the main rotor (2), a second auxiliary rotor (4) mechanically coupled to the main rotor (2), a first sensor device (SE1) which is assigned
(Continued)

to the first auxiliary rotor (3) for generating a first sensor signal dependent on a rotation angle of the first auxiliary rotor (3), a second sensor device (SE2) which is assigned to the second auxiliary rotor (4) for generating a second sensor signal dependent on a rotation angle of the second auxiliary rotor (4), a third sensor device (SE3) which is assigned to the main rotor (2) and which is used for generating a third sensor signal dependent on a relative rotation angle ($\gamma$) of the main rotor (2) and an evaluation device for determining the absolute rotation angle ($\delta$) of the main rotor (2) from the sensor signals of the sensor devices (SE1, SE2, SE3). The detection range ($\alpha$) of the third sensor device is less than 360°.

17 Claims, 2 Drawing Sheets

(56) References Cited

U.S. PATENT DOCUMENTS

| | | | | |
|---|---|---|---|---|
| 2008/0307873 | A1* | 12/2008 | Kang | G01D 5/145 73/117.02 |
| 2010/0235054 | A1* | 9/2010 | Hoskins | B62D 15/0245 701/42 |
| 2011/0169483 | A1* | 7/2011 | Saito | G01D 5/2013 324/207.25 |
| 2012/0119731 | A1* | 5/2012 | Deitmerg | G01B 7/30 324/207.25 |

FOREIGN PATENT DOCUMENTS

| | | |
|---|---|---|
| DE | 10110785 A1 | 9/2002 |
| DE | 102004004025 A1 | 10/2004 |
| DE | 202009016539 U1 | 5/2010 |
| DE | 102009031176 A1 | 12/2010 |
| DE | 102010053596 A1 | 6/2012 |

OTHER PUBLICATIONS

Search Report issued in corresponding German Application No. 10 2016 115 310.9, dated Apr. 13, 2017 (5 pages).

Notice of Preliminary Rejection in corresponding Korean Application No. 10-2019-7007588, dated Mar. 29, 2021 (11 pages).

* cited by examiner

SENSOR SYSTEM FOR DETERMINING AN ABSOLUTE ROTATIONAL ANGLE OF A SHAFT, METHOD FOR DETERMINING AN ABSOLUTE ROTATIONAL ANGLE OF A SHAFT, AND VEHICLE HAVING A SENSOR SYSTEM

The invention relates to a sensor system for determining an absolute rotation angle of a shaft with a rotation angle of more than one revolution, in particular for determining an absolute steering angle of a steering shaft in a vehicle with a steering angle of more than one revolution, wherein the sensor system comprises a main rotor that can be connected rotationally synchronously to the shaft, a first auxiliary rotor which is mechanically coupled to the main rotor with a constant and uniform first translation, a second auxiliary rotor which is mechanically coupled to the main rotor with a constant and uniform second translation different from the first translation, a first sensor device which is assigned to the first auxiliary rotor and used to generate a first sensor signal dependent on a rotation angle of the first auxiliary rotor, a second sensor device which is assigned to the second auxiliary rotor and used to generate a second sensor signal dependent on a rotation angle of the second auxiliary rotor, a third sensor device which is assigned to the main rotor and used for generating a third sensor signal dependent on a relative rotation angle of the main rotor and an evaluation device for determining the absolute rotation angle of the main rotor from the sensor signals of the sensor devices. The invention also relates to a method for determining an absolute angle of rotation of a shaft with a sensor system as described above, and to a vehicle having such a sensor system.

Generic sensor systems which, in order to determine an absolute angle of rotation of a shaft, have a shaft that can be connected rotationally synchronously to the shaft, a first auxiliary rotor which is mechanically coupled to the main rotor with a constant and uniform first translation, a second auxiliary rotor mechanically coupled to the main rotor with a constant and uniform second translation different from the first translation, a first sensor device which is assigned to the first auxiliary rotor and used to generate a first sensor signal dependent on a rotation angle of the first auxiliary rotor, a second sensor device which is assigned to the second auxiliary rotor and used to generate a second sensor signal dependent on a rotation angle of the second auxiliary rotor, and an evaluation device for determining the absolute rotation angle of the main rotor from the sensor signals of the sensor devices, are generally known from the prior art, for example from DE 195 06 938 A1 or DE 10 2009 031 176 A1. By means of the first sensor device and the second sensor device, the absolute angle of rotation of the main rotor can be determined.

Related methods for determining the absolute angle of rotation of the shaft with such a sensor system are also generally known, for example, from the first-mentioned DE 195 06 938 A1 or DE 101 10 785 A1, to which reference is made in particular for further details in relation to the determination of the absolute rotation angle of the shaft.

In order to improve the accuracy in the determination of the absolute angle of rotation of the shaft, in the sensor system described in DE 10 2009 031 176 A1 a third sensor device is also provided, which is designed to detect the relative angle of rotation of the main rotor with high resolution. By means of the first sensor device and the second sensor device it is possible to determine the absolute angle of rotation of the shaft with a first accuracy, in particular, the rotation angle range in which the main rotor is positioned. By means of the third, high-resolution sensor device the relative angle of rotation of the main rotor within this rotation angle range can be determined with a second, better accuracy, so that the absolute rotation angle can be ascertained with an improved accuracy overall.

To this end the third sensor device has a magnetic sensor arranged between the two auxiliary rotors on a common printed circuit board in a stationary manner with respect to the main rotor as well as a magnetic ring arranged on the main rotor and formed over the entire circumference, which is composed of magnetic north and south poles arranged alternately in the circumferential direction, which are moved past the magnetic sensor during the rotation of the main rotor. A north pole and an adjacent south pole together form a pole pair. From the flux density detected by the magnetic sensor or the detected field direction, the relative rotation angle of the main rotor within a rotation angle range can be determined.

Such a sensor system can certainly be used to determine the absolute angle of rotation of a shaft with a high accuracy. Such a sensor system, however, in particular the above-described third sensor device, is complicated to manufacture and thus expensive.

It is also the case, especially if the first sensor device and the second sensor device are also designed as magnetic sensor devices, that the sensor devices can have a mutual influence on one another, in particular, the magnetic ring of the third sensor device can distort the sensor signal of the first sensor device and/or the second sensor device, whereby errors or inaccuracies may arise which can have an adverse effect on the achievable accuracy of the determination of the absolute angle of rotation. In addition, the magnets of the first sensor device and/or the second sensor device can distort the third sensor signal.

An object of the invention therefore is to provide an alternative sensor system, preferably a more cost-effective sensor system and, in particular, a sensor system with which the mutual influence of the individual sensor devices among one another can be reduced, as well as an associated method for determining the absolute angle of rotation of the shaft with a such a sensor system.

This object is achieved according to the invention by means of a sensor system, by a method and by a vehicle according to the respective independent patent claims. Advantageous embodiments of the invention are the subject of the dependent claims, the description and the figures and are explained in more detail below.

A sensor system according to the invention is characterized in that the third sensor device has a detection range which is less than 360°. This means the detection range of the third sensor device in a sensor system according to the invention is less than one full revolution. Therefore, the rotation angle range, in which the third sensor signal can be generated by means of the third sensor device as a function of the relative angle of rotation of the main rotor, does not extend over a full revolution but only over a defined angular range. In particular, using the third sensor device the relative angle of rotation of the main rotor can be detected only in this angular range, the so-called detection range.

A sensor system according to the invention is preferably designed to detect the absolute angle of rotation of the shaft in both directions of rotation, i.e. both to the left and to the right, i.e., the following relation preferably applies: $\alpha \leq \pm 360°/q$ with $q > 1$.

Due to the fact that the third sensor device has a detection range which does not extend over a full revolution in the circumferential direction but only over a portion thereof, a sensor system according to the invention is more cost-effective than a sensor system with a third sensor device with a detection range of 360°, such as that described in DE 10 2009 031 176 A1, because in particular the third sensor device can be designed more simply and is thus also simpler and more cost-effective to produce.

With a sensor system according to the invention, the absolute angle of rotation of the shaft can only be determined with a higher accuracy within the detection range. Since, however, experience has shown that the increased accuracy is generally not required over the entire rotation angle range, or a full revolution, but only in a defined rotation angle range—for example, in vehicles in the determination of the absolute steering angle of a steering shaft the increased accuracy is typically only required around the zero position—in many application cases, notably in the case of an advantageous arrangement of the third sensor device within the sensor system, a sensor system according to the invention can be used without significant disadvantages.

Within the meaning of the invention the absolute angle of rotation of a shaft is defined as the angle through which the shaft is turned relative to a defined zero position, wherein the absolute angle of rotation of the shaft can be >360°.

The relative angle of rotation of the shaft within the meaning of the invention is the angle of rotation of the shaft within one revolution, i.e., the relative rotation angle can be no greater than 360°. For example, if the absolute angle of rotation of the shaft is +400°, the relative angle of rotation of the shaft is +40°. Accordingly, the relative rotation angle for an absolute rotation angle of −460° is −100°.

A rotationally synchronous connection between two rotatably mounted components is a connection in which a rotation of the first component by a defined angle of rotation causes a rotation of the second component by the same angle of rotation and vice versa. In other words, if the main rotor is rotationally synchronously connected to the shaft, the absolute angle of rotation of the main rotor corresponds to the absolute angle of rotation of the shaft and vice versa. Preferably, in order to produce a rotationally synchronous connection to the shaft the main rotor can be connected to the shaft in a rotationally fixed manner, in particular without play in the circumferential direction.

A rotor within the meaning of the invention is a body which is mounted such that it can rotate through a rotation angle, wherein preferably at least one rotor of the sensor system, i.e. at least the main rotor and/or the first auxiliary rotor and/or the second auxiliary rotor, is designed for example as a disc-shaped rotary body, for example as a rotationally mounted disc, especially as a friction wheel, a gearwheel, pulley or the like.

The element designated as the main rotor is the rotating body of the sensor system, which is designed or provided to be connected in a rotationally synchronized manner to the shaft, the of rotation angle of which is to be detected by means of the sensor system according to the invention. Auxiliary rotors are the rotationally mounted bodies of the sensor system, which are mechanically coupled to the main rotor with a translation.

In a sensor system according to the invention the main rotor preferably forms a gear mechanism with the first auxiliary rotor and the second auxiliary rotor (in each case). In this case, in particular friction-gear mechanisms, gearwheel transmissions and traction drives have proved suitable. In other words, the main rotor is preferably coupled to the first auxiliary rotor by means of a friction gear mechanism, a gearwheel transmission and/or a traction gearbox with a constant and uniform first translation, and preferably mechanically coupled to the second auxiliary rotor by means of a friction gear mechanism, a gearwheel transmission and/or a traction gearbox with a second translation, which is different from the first but also constant and uniform.

Gearwheel transmissions have proven to be particularly advantageous, so that preferably the main rotor as well as the first auxiliary rotor and the second auxiliary rotor are each implemented as gear wheels, wherein the main rotor meshes with the first auxiliary rotor and the second auxiliary rotor, and the first auxiliary rotor and the second auxiliary rotor have different numbers of teeth, so that the first auxiliary rotor is coupled to the main rotor with a constant and uniform first translation and the second auxiliary rotor is coupled with a second constant and uniform translation, different from the first translation.

The main rotor is preferably designed to be positioned directly on the shaft, wherein the main rotor can particularly preferably be connected to the shaft in a rotationally fixed manner and without play in the circumferential direction. This enables a virtually hysteresis-free determination of the relative angle of rotation of the main rotor, so that with a correspondingly high resolution of the third sensor device in the detection range the absolute angle of rotation of the main rotor, or the absolute angle of rotation of the shaft rotationally synchronously connected thereto, can be determined within the detection range with a high degree of accuracy and virtually free of hysteresis.

In an advantageous design of a sensor system according to the invention the sensor system is designed to determine the absolute rotation angle of the main rotor with a first accuracy when the relative rotational angle of the main rotor is outside the detection range of the third sensor device, and with a second, preferably better accuracy when the relative rotational angle of the main rotor is inside the detection range of the third sensor device.

The resolution of the third sensor device is preferably at least as high as the resolution of the absolute angle of rotation of the main rotor determined using only the first sensor device and/or the second sensor device, preferably at least twice as high as this, in particular at least four times as high as this. Particularly preferably, the resolution of the third sensor device is at least ten times the resolution of the resolution with which the absolute rotation angle can be determined from the first sensor signal and/or the second sensor signal without taking into account the third sensor signal.

A sensor system according to the invention with a third sensor device, which has a detection range of less than 360°, also has the advantage that with a skilful arrangement of the third sensor device, in particular its detection range, any mutual influence between the third sensor device and the first sensor device and/or the second sensor device can be reduced or even completely prevented. In a further advantageous design of a sensor system according to the invention the third sensor device is designed and arranged relative to the first sensor device and/or to the second sensor device in such a way that at least around a defined relative rotation angle of the main rotor, preferably around a relative zero position of the main rotor, any mutual influence between the third sensor device and the first sensor device and/or the second sensor device is reduced or even prevented, in particular during the generation of the third sensor signal. In other words, this means that the third sensor device is preferably designed and arranged relative to the first sensor device and/or the second sensor device in such a way that when the main rotor has a rotation angle in the detection range of the third sensor device, either no or only a reduced mutual influence occurs between the third sensor device with the first sensor device and/or the second sensor device.

In addition, the fact that the detection range of the third sensor device does not extend beyond a full revolution results in an additional option for checking the plausibility of the sensor signals, which will be described in more detail later, in particular in connection with a method according to the invention.

In a further advantageous arrangement of a sensor system according to the invention an absolute zero position of the main rotor coincides with the relative zero position of the main rotor. The absolute zero position of the main rotor is defined as the rotation angle position in which the main rotor has an absolute rotation angle of 0°. The relative zero position within the meaning of the invention is accordingly understood to mean the rotation angle position in which the main rotor has a relative rotation angle of 0°. In other words, if the absolute angle of rotation of the main rotor is 0°, the relative angle of rotation of the main rotor is preferably also 0°.

In a further advantageous arrangement of a sensor system the detection range of the third sensor device extends around a defined, relative rotation angle of the main rotor, preferably around the relative zero position of the main rotor, wherein the detection range extends in particular symmetrically about the defined relative rotation angle of the main rotor.

The detection range of the third sensor device of a sensor system according to the invention preferably extends over a rotation angle range of ≤270°, wherein the detection range preferably lies within the rotation angle range of +135° to −135°, with respect to the relative angle of rotation of the main rotor.

In a further advantageous design of a sensor system according to the invention the detection range of the third sensor device extends over a rotation angle range of 180°, preferably from +90° to −90° with respect to the relative rotation angle of the main rotor.

In a further advantageous arrangement of a sensor system according to the invention the detection range of the third sensor device extends over a rotation angle range of ≤150° and is preferably within the rotation angle range of +70° to −75°, with respect to the relative angle of rotation of the main rotor.

In a further advantageous arrangement of a sensor system according to the invention the third sensor device is a magnetic sensor device, wherein in order to generate the third sensor signal, the third sensor device preferably comprises a magnetic sensor and a magnetic ring segment, which extends in the circumferential direction, wherein an angular range, over which the magnetic ring segment extends in the circumferential direction, in particular defines the detection range. It goes without saying that the third sensor device can also be an optical sensor device or another sensor device, in particular one known from the prior art and suitable for this purpose.

The first sensor device provided for generating a first sensor signal dependent on the angle of rotation of the first auxiliary rotor is preferably also a magnetic sensor device. However, the first sensor device can also be an optical sensor device or any other sensor device, known from the prior art and suitable for this purpose. Accordingly, the second sensor device is also preferably an optical sensor device, a magnetic sensor device or any other sensor device suitable for this purpose, in particular known from the prior art.

In a further advantageous arrangement of a sensor system according to the invention the magnetic sensor of the third sensor device is arranged to be stationary in the sensor system and the magnetic ring segment is fixed to the main rotor. In some cases, on the other hand, it may be advantageous to fix the magnetic sensor to the main rotor and to arrange the magnetic ring segment to be stationary in the sensor system. The components of the third sensor device, in particular the magnetic sensor and the magnetic segment ring, are preferably designed and arranged in the sensor system in such a way that the third sensor signal is generated when the relative angle of rotation of the main rotor is within the detection range of the third sensor device and no third sensor signal is generated when the relative angle of rotation of the main rotor is outside of the detection range of the third sensor device.

In a further advantageous design of a sensor system according to the invention the magnetic ring segment is composed of a plurality of pole pairs concatenated in the circumferential direction, wherein the pole pairs are preferably concatenated in such a way that the magnetic ring segment has north poles and south poles arranged alternately next to each other, wherein the pole pairs are implemented in particular as permanent magnet pole pairs.

In a further advantageous design of a sensor system according to the invention, all pole pairs extend over an equal pole-pair angular range, wherein the pole-pair angular range preferably corresponds to approximately double the accuracy with which the absolute rotation angle can be determined from the first sensor signal and the second sensor signal.

In a further advantageous design of a sensor system according to the invention, the magnetic sensor of the third sensor device is arranged in the sensor system in a fixed position in the region of the relative zero position of the main rotor and the angular range over which the magnetic ring segment of the third sensor device extends and which preferably defines the detection range is chosen at least so small that any influence on the first sensor device and/or the second sensor device due to the magnetic ring segment of the third sensor device and/or vice versa, at least about the relative zero position of the main rotor, is prevented, preferably over the entire detection range of the third sensor device.

Preferably, the first sensor device and/or the second sensor device are arranged at such a distance from the magnetic sensor of the third sensor device that while the third sensor signal is generated due to the movement of the magnetic ring segment past the magnetic sensor, any undesirable, mutual influence is avoided, in particular any influence of the first sensor device and/or the second sensor device on the third sensor device, and vice versa.

It has proved to be advantageous if the magnetic sensor of the third sensor device is arranged in a region around the relative zero position of the main rotor, in particular in the relative zero position of the main rotor, the detection range of the third sensor device is within the rotation angle range of +90° to −90°, with respect to the relative angle of rotation of the main rotor, and the first sensor device and the second sensor device are each arranged in the radial direction outside of a rotation angle range of ±90° to ±180°, preferably outside of a rotation angle range of ±120° to ±180°, in particular outside of a rotation angle range of ±135° to ±180°.

A method according to the invention is characterized by the steps:

detecting the sensor signals generated by the sensor devices and determining the absolute angle of rotation of the main rotor from the detected sensor signals, wherein the absolute rotation angle of the main rotor is determined from the first sensor signal and/or the second sensor signal when the relative rotation angle of the main rotor is outside of the detection range of the third sensor device, and wherein the absolute rotation angle is determined from the first sensor signal and/or the second sensor signal and the third sensor signal when the relative rotation angle of the main rotor is within the detection range of the third sensor device.

This means, in other words, that according to the invention, when the main rotor is turned through a rotation angle such that the relative angle of rotation is within the detection range and the third sensor signal is generated by means of the third sensor device, the first sensor signal and the second sensor signal are used to determine the absolute angle of rotation of the main rotor and, if the relative angle of rotation of the main rotor is outside the detection range and therefore no third sensor signal is generated, only the first sensor signal and the second sensor signal are used to determine the absolute angle of rotation.

With an appropriate design of the third sensor device, in particular if the third sensor device has a suitably high resolution, in this way the absolute angle of rotation can be determined with a high degree of accuracy within the detection range and with a lower degree of accuracy outside of the detection range. Since in most cases, however, a high degree of accuracy is only required within a specific angular range, in particular around the absolute zero position of the shaft or the main rotor, with a method according to the invention, in particular in conjunction with a sensor system according to the invention, in a particularly simple and cost-effective manner the absolute angle of rotation of a shaft can be determined with a high resolution and virtually hysteresis-free in a relevant rotation angle range, and in many applications even without significant loss of function.

Accordingly, in an advantageous configuration of the method according to the invention, the absolute rotation angle of the main rotor is determined with a first accuracy when the relative rotation angle is outside the detection range of the main rotor of the third sensor device, and with a second, preferably better accuracy, when the relative rotation angle of the main rotor is inside the detection range of the third sensor device.

In a further advantageous design of a method according to the invention, a plausibility check of the sensor signals is additionally carried out, wherein the plausibility check preferably comprises the steps:

determining the absolute rotation angle of the main rotor with a first accuracy from the first sensor signal and/or the second sensor signal, testing whether the absolute rotation angle of the main rotor is inside or outside of a defined rotation angle range, wherein the defined rotation angle range corresponds in particular to the detection range, testing whether or not the third sensor signal has been generated by means of the third sensor device as a function of the associated relative rotation angle of the main rotor, testing whether or not an error condition exists, and if applicable, outputting an error condition signal.

Depending on the signal value of the error status signal appropriate measures can then be taken to transfer the system being monitored with the method according to the invention, for example a vehicle, preferably in connection with a sensor system according to the invention, into a safe state.

In a further advantageous design of a method according to the invention, an error condition exists if the determined absolute rotation angle of the main rotor is within the detection range of the third sensor device and no third sensor signal has been generated, or if the determined absolute rotation angle of the main rotor is outside of the detection range of the third sensor device and a third sensor signal has been generated.

A vehicle according to the invention is characterized in that it has a sensor system according to the invention, wherein the main rotor is rotationally synchronously connected to the shaft so that the absolute angle of rotation of the main rotor corresponds to the angle of rotation of the shaft.

The advantageous embodiments presented in relation to the sensor system and their advantages also apply mutatis mutandis to a method according to the invention as well as to a vehicle according to the invention having a sensor system according to the invention.

Additional features of the invention arise from the claims, the figures and the description of the figures. All features and feature combinations cited in the description above, and the features and feature combinations cited in the description of the figures below and/or shown in the figures alone, are applicable not only in the respective combination specified but also in other combinations or else in isolation, provided they are technically feasible.

The invention will now be described in greater detail based on an advantageous exemplary embodiment and by reference to the attached drawings.

Figure 1:
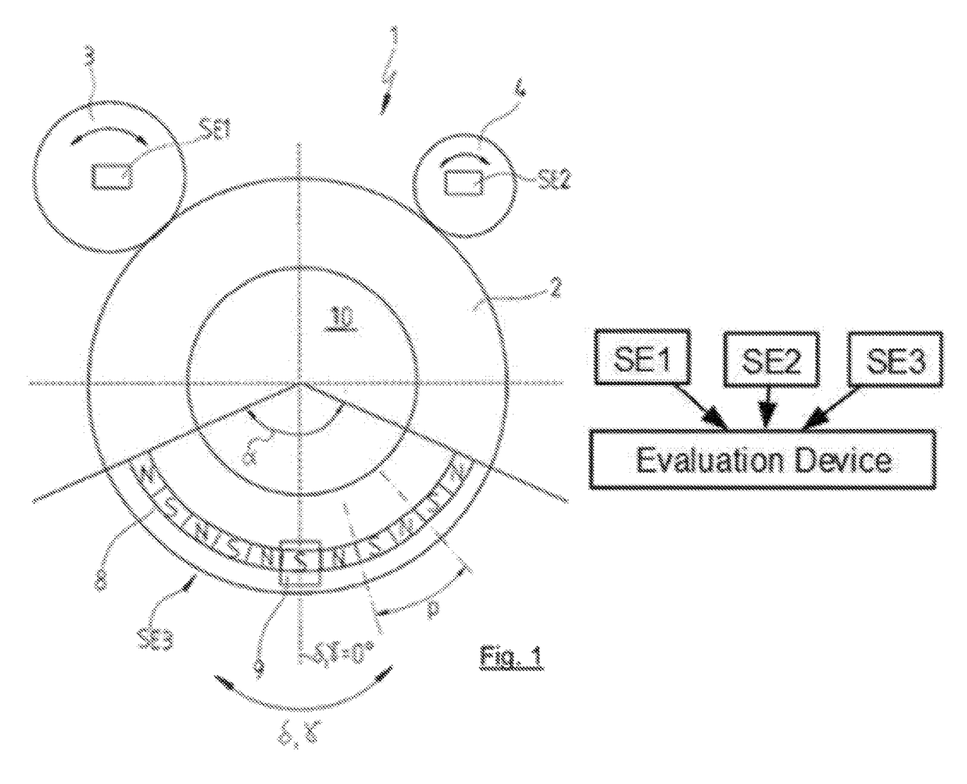
FIG. 1 in a schematic drawing the basic structure of a first exemplary embodiment of a sensor system according to the invention for determining an absolute steering angle of a steering shaft, FIG. 2a the signal traces of the first sensor signal and the second sensor signal against the absolute steering angle and FIG. 2b the signal trace of the third sensor signal against the absolute steering angle.

Shown are:

FIG. 1 shows a schematic drawing of the basic structure of a first exemplary embodiment of a sensor system 1 according to the invention for determining an absolute steering angle δ of a steering shaft 10.

The sensor system 1 according to the invention has a main rotor 2 connected to the steering shaft 10 in a rotationally fixed manner and without play in the circumferential direction, and a first auxiliary rotor 3 and a second auxiliary rotor 4. The main rotor 2 and the first auxiliary rotor 3 and the second auxiliary rotor 4 are each implemented as gear wheels 2, 3, 4 rotationally mounted about axes, which are not described further here.

The main rotor 2, due to its rotationally fixed connection to the steering shaft 10 without play in the circumferential direction, is connected in a rotationally synchronous manner to the steering shaft 10, so that a rotation of the steering shaft 10 by a defined absolute rotation angle δ causes a rotation of the main rotor 2 by the same defined absolute rotation angle δ.

The first auxiliary rotor 3 and the second auxiliary rotor 4 thus each form a gear mechanism with the main rotor 2, wherein the auxiliary rotor 3 is mechanically coupled to the main rotor 2 with a constant and uniform first translation and the second auxiliary rotor 4 is coupled to the main rotor 2 with a second translation, different from the first translation but also constant and uniform. To this end the second auxiliary rotor 4 has a different number of teeth to the first auxiliary rotor 3.

To generate a first sensor signal S1 dependent on a rotation angle of the first auxiliary rotor 3 (see FIG. 2*a*), the sensor system according to the invention 1 has a first sensor device SE1 and a second sensor device SE2 for generating a second sensor signal S2 dependent on a rotation angle of the second auxiliary rotor 4.

In addition, the sensor system according to the invention 1 has a third sensor device SE3, which is designed to generate a third sensor signal S3 (see FIG. 2*b*) as a function of a relative angle of rotation γ of the main rotor 2.

In addition, the sensor system 1 according to the invention has an evaluation device, not shown here, for determining the absolute angle of rotation δ of the main rotor 2, or the steering shaft 10 rotationally synchronously connected thereto, from the sensor signals S1, S2, S3 of the sensor devices SE1, SE2, SE3.

All three sensor devices SE1, SE2 and SE3 in this exemplary embodiment of a sensor system 1 according to the invention are implemented as magnetic sensor devices SE1, SE2 and SE3, wherein the first sensor device SE1 and the second sensor device SE2 are each designed to detect the angle of rotation of the associated auxiliary rotor 3 or 4 in each case over at least one full revolution, i.e. at least over a rotation angle range of 360°, so that the absolute angle of rotation δ of the main rotor or the steering shaft 10 can be determined from the first sensor signal S1 and/or the second sensor signal S2 alone.

The third sensor device SE3, on the other hand, is designed according to the invention solely to detect the relative angle of rotation of the γ main rotor 2 in a defined rotation angle range α, the so-called detection range α, or to generate the third sensor signal S3 only in this rotation angle range α.

The evaluation device of the sensor system 1 according to the invention is firstly designed to determine the absolute angle of rotation δ of the main rotor 2 solely from the first sensor signal S1 generated by the first sensor device SE1 and/or from the second sensor signal S2 generated by the second sensor device SE2, for example according to the nonius principle, such as is described in DE 195 06 938 A1, to which explicit reference is made at this point. Secondly the evaluation device is designed to determine the absolute rotation angle δ of the main rotor 2 and thus the absolute steering angle δ of the steering shaft 10 from all three sensor signals S1, S2 and S3, provided the third sensor signal S3 has been generated for the respective associated, absolute angle of rotation δ of the main rotor 2 or the steering shaft 10 rotationally synchronously connected thereto, in particular according to a method described in DE 10 2009 031 176 A1.

By means of the third sensor device SE3, given an appropriate design of the third sensor device SE3 it is possible in a simple manner to significantly improve the accuracy with which the absolute angle of rotation δ of the main rotor 2 or the absolute angle of rotation δ of the shaft 10 can be determined within the detection range α. This can be achieved very simply with a magnetic, third sensor device SE3, which is designed as in this exemplary embodiment of a sensor system 1 according to the invention and which has a magnetic sensor 9 arranged in a fixed position within the sensor system 1 and a magnetic ring segment 8 fixed to the main rotor 2, which is composed of a plurality of permanent magnet pole pairs N-S concatenated in the circumferential direction, wherein the pole pairs N-S are concatenated in such a way that the magnetic ring segment 8 has north poles N and south poles S arranged alternately next to each other.

The magnetic sensor 9 is fixed, in particular in a stationary manner with respect to the magnetic ring segment 8 arranged on the main rotor 2 in the sensor system 1, which can be moved past the magnetic sensor 9 under a rotation of the shaft 10 or under a rotation of the main rotor 2 by a sufficient angle of rotation. Because the field vector continually changes direction in the vicinity of the magnetic poles N, S, and thus in the vicinity of a pole pair N-S, the position of two adjacent magnetic poles N, S and therefore the position of a pole pair N-S relative to the magnetic sensor 9 can be detected using measurements of the magnetic flux density or measurement of the field direction. Thus, by means of the third sensor device SE3 a third sensor signal S3 dependent on the relative angle of rotation γ of the main rotor 2 can be generated.

The pole pairs N-S each extend in the circumferential direction over an equal pole-pair angular range p, which in this case corresponds to approximately 2.5 times the accuracy in a direction of rotation with which the absolute rotation angle δ can be determined from the first sensor signal S1 and the second sensor signal S2. This alone enables a good improvement in the accuracy in the determination of the absolute angle of rotation δ.

In the exemplary embodiment described, the pole pairs N-S each extend over a pole-pair angular range p of approximately 5°, wherein the absolute angle of rotation δ of the steering shaft 10 can be determined from only the first sensor signal S1 and the second sensor signal S2 with an initial accuracy of approximately ±2°. In the interest of a clear presentation, however, the poles N-S in FIG. 1 are each shown with a pole-pair angular range of p≈27°, not with the actual 5°. Accordingly, the described exemplary embodiment in reality has 33 pole pairs N-S and not, as shown schematically in FIG. 1, merely five and a half pole pairs N-S, because for a detection range of ±75°, in other words for a detection range which extends over a total rotation angle range of 150°, i.e. q=2.4, for a pole-pair angular range of p=5° a total of 33 pole pairs are required rather than five and a half.

The accuracy achievable as a result, or the improvement in accuracy using the third sensor device SE3 for the determination of the absolute rotation angle δ depends firstly on the pole-pair angular range p of the pole pairs N-S as well as the first accuracy with which the absolute rotation angle δ of the shaft 10 can be determined from the first sensor signal S1 and the second sensor signal S2, and on the resolution of the magnetic sensor 9.

If the achievable first accuracy with which the absolute angle of rotation δ of the main rotor 2 or the shaft 10 can be determined from the first sensor signal S1 and/or the second sensor signal S2 alone, as in this case for example ±2°, and if each pole pair extends over a pole-pair angular range p with an extent of 5°, the absolute angle of rotation δ of the shaft 10 can be determined with a correspondingly high resolution of the magnetic sensor 9 with a second accuracy of 0.028°, wherein the accuracy of the absolute rotation angle δ is given by the first accuracy in one direction of rotation, divided by the quotient of 360° and the pole-pair angular range p, which means that in the above numerical example the following applies: ±δ=2°/(360°/5°)= 0.02777777778≈0.028°.

The magnetic sensor 9 of the third sensor device SE3 in this exemplary embodiment is arranged to be stationary in the region of the absolute zero position of the steering shaft 10 or of the main rotor 2, in particular directly at the absolute zero position, i.e. at δ=0°, in the sensor system 1, wherein in this sensor system 1 the relative zero position of the main rotor 2, i.e. γ=0°, coincides with the absolute zero position, i.e. δ=0°. This enables a particularly high accuracy to be achieved, in particular around the zero position.

If in addition the detection range α is chosen to be sufficiently small and for example, as in this exemplary embodiment, is limited to a rotation angle range of 150°, wherein the detection range extends in particular symmetrically about the zero position and is located in a rotation angle range of +75° to −75° with respect to the relative angle of rotation γ of the main rotor 2, then in addition at least during the generation of the third sensor signal S3, i.e. while the main rotor 2 has a relative angle of rotation γ which is within the detection range α, a mutual interaction between the first sensor device SE1 and/or the second sensor device SE2 and the third sensor device SE3 can be prevented. This enables a particularly high accuracy to be achieved in the determination of the absolute angle of rotation δ of the main rotor 2 or the steering shaft 10. In particular, it is thus possible to prevent the possibility that the third sensor signal S3 might be distorted by the first sensor device SE1 and/or the second sensor device SE2, and/or that the magnetic ring segment 8 might distort the first sensor signal S1 and/or the second sensor signal S2.

Figure 2A:
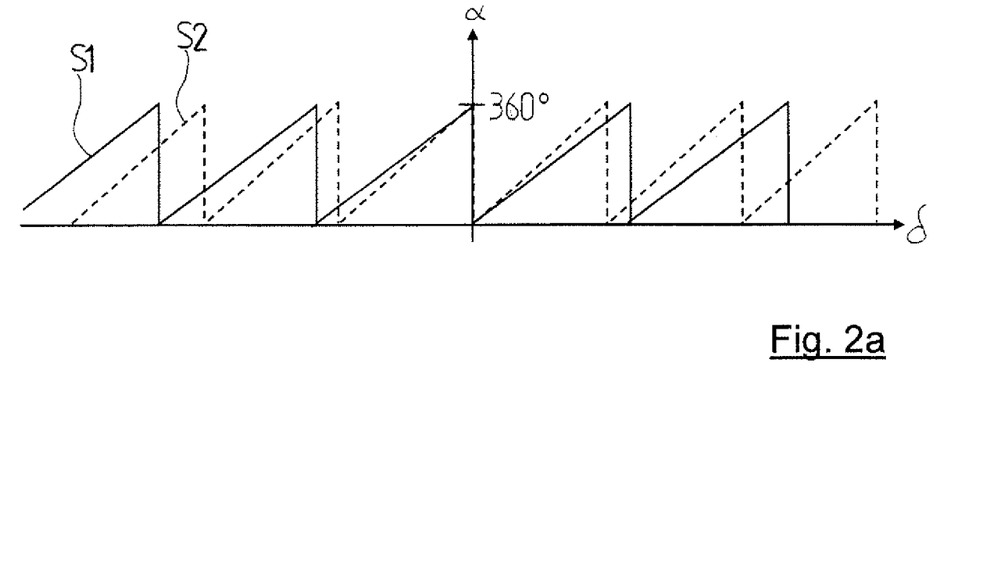
Figure 2B:
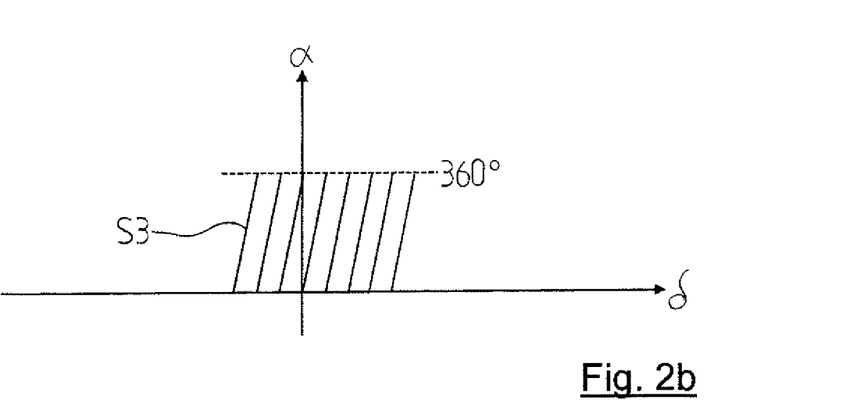

For better understanding, FIGS. 2a and 2b show the associated signal traces of the sensor signals S1, S2 and S3, wherein the sensor signals S1 and S2 are generated over the entire absolute rotation angle range and thus also in each case over a full rotation of the main rotor 2, while the third sensor signal S3 is generated only over a sub-region of the rotation angle range of the main rotor 2.

According to the invention, the absolute steering angle δ of the steering shaft 10 is determined with a sensor system 1 according to the invention described above, by the sensor signals S1, S2, S3 generated by the sensor devices SE1, SE2, SE3 being detected in a first step, and in a second step the absolute angle of rotation δ of the main rotor 2, which corresponds to the absolute angle of rotation of the δ steering shaft 10, being determined from the sensor signals S1, S2, S3, wherein the absolute rotation angle δ is determined from the first sensor signal S1 and/or the second sensor signal S2 when the relative angle of rotation γ of the main rotor 2 is located outside of the detection range α of the third sensor device SE3, and wherein the absolute rotation angle δ is determined from the first sensor signal S1 and/or the second sensor signal S2 and the third sensor signal S3 when the relative angle of rotation γ of the main rotor 2 is within the detection range α.

In an advantageous implementation of the method according to the invention, the absolute rotation angle δ of the main rotor 2 is determined with a first accuracy when the relative rotation angle γ of the main rotor 2 is outside the detection range α of the third sensor device SE3, and with a second, preferably better accuracy, when the relative rotation angle γ of the main rotor 2 is inside the detection range α of the third sensor device SE3.

Furthermore, in an advantageous implementation of the method according to the invention with a sensor system 1 according to the invention described above, in the determination of the absolute steering angle, a plausibility check of the sensor signals S1, S2 and S3 is additionally carried out, wherein the plausibility check comprises the steps:

determining the absolute rotation angle δ of the main rotor 2 with a first accuracy from the first sensor signal S1 and/or the second sensor signal S2, testing whether the determined absolute rotation angle δ of the main rotor 2 is inside or outside of the detection range α, testing whether or not the third sensor signal S3 has been generated by means of the third sensor device SE3 as a function of the associated relative rotation angle γ of the main rotor 2, testing whether an error condition exists or not, and outputting an error condition signal.

An error condition exists if the determined absolute rotation angle δ of the main rotor 2 is within the detection range α of the third sensor device SE3 and no third sensor signal S3 has been generated, or if the determined absolute rotation angle δ of the main rotor 2 is outside of the detection range α of the third sensor device SE3 and a third sensor signal S3 has been generated.

With the sensor system 1 according to the invention described above, and with the method according to the invention described above, it is true that the absolute angle of rotation δ of a shaft 10 can only be determined in a virtually hysteresis-free manner with a high resolution and thus a high accuracy within a limited detection range α. But since in most cases, particularly in steering systems of vehicles, this is only required in a defined rotation angle range, in particular only in a rotation angle range around the zero position, a sensor system 1 according to the invention can be used in many applications without significant disadvantages. As a result, on account of its cost advantages, because the third sensor device SE3 only has a detection range of less than 360°, a sensor system according to the invention compared with a sensor system known from the prior art with a third sensor device with a detection range of 360°, i.e. a full revolution, is more advantageous.

In addition, the restriction of the detection range α of the third sensor device SE3 to a defined angle of rotation range α, given a skilful arrangement of the individual sensor devices SE1, SE2 and SE3 relative to each other within the sensor system 1, enables the reduction or even, in some cases, the complete prevention of the mutual influence between the first sensor device SE1 and/or the second sensor device SE2 and the third sensor device SE3, in particular during the generation of the third sensor signal S3.

Furthermore, due to the generation of the third sensor signal 83 being limited to the detection range α of the third sensor device SE3, a functional safety advantage can be achieved, since in this way an additional option for checking the signal plausibility is obtained, and in particular, an improved diagnostic capability of the sensor system can be achieved as a result.

The smaller the detection range α of the third sensor device is selected, the higher is the achievable safety gain.

Of course, a wide variety of design modifications to the exemplary embodiment elaborated above is possible without departing from the content of the patent claims.

LIST OF REFERENCE NUMERALS 1 sensor system according to the invention
2 main rotor
3 first auxiliary rotor
4 second auxiliary rotor
8 magnetic ring segment with pole pairs
9 magnetic sensor
10 shaft
N magnetic north pole
p pole-pair angular range
S magnetic south pole S1 first sensor signal
S2 second sensor signal
S3 third sensor signal
SE1 first sensor device
SE2 second sensor device
SE3 third sensor device
α detection (angular) range of the third sensor device
δ absolute rotation angle of the main rotor
γ relative rotation angle of the main rotor

The invention claimed is:

1. A sensor system for determining an absolute steering angle of a steering shaft in a vehicle with a steering angle of more than one revolution, wherein the sensor system comprises:
   a main rotor that is connected rotationally synchronously with the steering shaft;
   a first auxiliary rotor which is mechanically coupled to the main rotor with a constant and uniform first translation;
   a second auxiliary rotor which is mechanically coupled to the main rotor with a constant and uniform second translation different from the first translation;
   a first sensor device which is assigned to the first auxiliary rotor and which is used to generate a first sensor signal dependent on a rotation angle of the first auxiliary rotor;
   a second sensor device which is assigned to the second auxiliary rotor and which is used to generate a second sensor signal dependent on a rotation angle of the second auxiliary rotor;
   a third sensor device which is assigned to the main rotor and which is used for generating a third sensor signal dependent on a relative rotation angle of the main rotor; and
   an evaluation device for determining an absolute rotation angle of the main rotor from the sensor signals of the sensor devices,
   wherein the third sensor device has a detection range, which is less than 360°,
   wherein the absolute rotation angle of the main rotor is determined from the first sensor signal and/or the second sensor signal when the relative rotation angle of the main rotor is outside of the detection range of the third sensor device, and
   wherein the absolute rotation angle of the main rotor is determined from the first sensor signal and/or the second sensor signal and further from the third sensor signal when the relative rotation angle of the main rotor is within the detection range of the third sensor device.

2. The sensor system according to claim 1, wherein the sensor system determines the absolute rotation angle of the main rotor with a first accuracy when the relative rotational angle of the main rotor is outside the detection range of the third sensor device, and with a second, higher accuracy when the relative rotational angle of the main rotor is inside the detection range of the third sensor device.

3. The sensor system according to claim 1, wherein the third sensor device is arranged relative to the first sensor device or the second sensor device in such a way that at least around a relative zero position of the main rotor, a mutual influence that distorts the sensor signals between the third sensor device and the first sensor device or the second sensor device is avoided, during the generation of the third sensor signal.

4. The sensor system according to claim 3, wherein an absolute zero position of the main rotor is coincident with the relative zero position of the main rotor.

5. The sensor system according to claim 3, wherein the detection range of the third sensor device extends around a defined, relative rotation angle of the main rotor, comprising the relative zero position of the main rotor, wherein the detection range extends symmetrically about the defined relative rotation angle of the main rotor.

6. The sensor system according to claim 5, wherein the detection range of the third sensor device extends over a rotation angle range of 180°, from +90° to −90° of the relative rotation angle of the main rotor.

7. The sensor system according to claim 5, wherein the detection range of the third sensor device is ≤150° and within the rotation angle range of +75° to −75° the relative rotation angle of the main rotor.

8. The sensor system according to claim 1, wherein in order to generate the third sensor signal, the third sensor device comprises a magnetic sensor, and a magnetic ring segment extending in a circumferential direction, wherein an angular range, through which the magnetic ring segment extends in the circumferential direction, defines the detection range.

9. The sensor system according to claim 8, wherein the magnetic sensor is arranged to be stationary in the sensor system and the magnetic ring segment is fixed to the main rotor, wherein components of the third sensor device, the magnetic sensor and the magnetic ring segment, are arranged within the sensor system in such a way that the third sensor signal is generated when the relative rotation angle of the main rotor is within the detection range of the third sensor device and no third sensor signal is generated when the relative rotation angle of the main rotor is outside of the detection range of the third sensor device.

10. The sensor system according to claim 8, wherein the magnetic ring segment is composed of a plurality of pole pairs concatenated in the circumferential direction, wherein the pole pairs are concatenated in such a way that the magnetic ring segment has north poles and south poles arranged alternately next to each other.

11. The sensor system according to claim 10, wherein all pole pairs extend in the circumferential direction over an equal pole-pair angular range, wherein the pole-pair angular range corresponds to double the accuracy with which the absolute rotation angle is determined from the first sensor signal and the second sensor signal.

12. The sensor system according to claim 8, wherein the magnetic sensor of the third sensor device is arranged in the sensor system in a fixed position in a region of a relative zero position of the main rotor and the angular range, over which the magnetic ring segment of the third sensor device extends and which defines the detection range, is chosen at least to be small such that any influence that distorts the sensor signals of the first sensor device or the second sensor device due to the magnetic ring segment of the third sensor device or vice versa, at least about the relative zero position of the main rotor, is prevented over the detection range of the third sensor device.

13. A vehicle having the sensor system claim 1, wherein the main rotor is connected rotationally synchronously to the steering shaft, so that the absolute rotation angle of the main rotor corresponds to the angle of rotation of the steering shaft.

14. A method for calculating an absolute steering angle of a steering shaft with a sensor system in a vehicle with a steering angular range of more than one revolution, wherein a main rotor is connected rotationally synchronously with the steering shaft, the method comprising:

detecting first, second, and third sensor signals generated by first, second, and third sensor devices, respectively, of the sensor system; and determining the absolute rotation angle of a main rotor from the detected sensor signals, wherein the third sensor device has a detection range, which is less than 360°, and is used for generating a third sensor signal dependent on a relative rotation angle of the main rotor, wherein the absolute rotation angle of the main rotor is determined from the first sensor signal and/or the second sensor signal when a relative rotation angle of the main rotor is outside of the detection range of the third sensor device, and wherein an absolute rotation angle is determined from the first sensor signal and/or the second sensor signal and further from the third sensor signal when the relative rotation angle of the main rotor is within the detection range of the third sensor device.

15. The method according to claim 14, wherein the absolute rotation angle of the main rotor is determined with a first accuracy when the relative rotation angle of the main rotor is outside the detection range of the third sensor device, and with a second, higher accuracy when the relative rotation angle of the main rotor is inside the detection range of the third sensor device.

16. The method according to claim 14, further comprising:

in addition, performing a plausibility check of the first, second, and third sensor signals wherein the plausibility check comprises:

determining the absolute rotation angle of the main rotor with a first accuracy from the first sensor signal or the second sensor signal, testing whether the absolute rotation angle of the main rotor is inside or outside of a defined rotation angle range, wherein the defined rotation angle range corresponds in to the detection range, testing whether or not the third sensor signal has been generated by the third sensor device as a function of the relative rotation angle of the main rotor, testing whether an error condition exists or not, and outputting an error condition signal when the error condition exists.

17. The method according to claim 16, wherein the error condition exists when the determined absolute rotation angle of the main rotor is within the detection range of the third sensor device and no third sensor signal has been generated, or when the determined absolute rotation angle of the main rotor is outside of the detection range of the third sensor device and the third sensor signal has been generated.

* * * * *